United States Patent
Iida

(10) Patent No.: US 10,178,266 B2
(45) Date of Patent: Jan. 8, 2019

(54) PRINTING APPARATUS AND CONTROL METHOD OF PRINTING APPARATUS

(71) Applicant: CANON KABUSHIKI KAISHA, Tokyo (JP)

(72) Inventor: Toshihiko Iida, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/238,533

(22) Filed: Aug. 16, 2016

(65) Prior Publication Data

US 2017/0064132 A1 Mar. 2, 2017

(30) Foreign Application Priority Data

Aug. 27, 2015 (JP) ................................. 2015-168290

(51) Int. Cl.
| | | |
|---|---|---|
| *H04N 1/32* | (2006.01) | |
| *G06K 15/02* | (2006.01) | |
| *G06K 15/00* | (2006.01) | |

(52) U.S. Cl.
CPC ..... *H04N 1/32133* (2013.01); *G06K 15/1809* (2013.01); *G06K 15/1813* (2013.01); *G06K 15/1815* (2013.01); *G06K 15/1819* (2013.01); *G06K 15/1889* (2013.01); *G06K 15/4095* (2013.01)

(58) Field of Classification Search
CPC ........... H04N 1/32133; G06K 15/1889; G06K 15/1809; G06K 15/1813; G06K 15/1815; G06K 15/4095; G06K 15/1819

USPC .................................... 358/1.13, 1.14, 1.15
See application file for complete search history.

(56) References Cited

U.S. PATENT DOCUMENTS

| | | | | |
|---|---|---|---|---|
| 2002/0097431 A1* | 7/2002 | Ikegami | ................ | G06F 21/608 358/1.15 |
| 2006/0283341 A1* | 12/2006 | Otsuka | ................... | B65B 27/08 101/35 |
| 2007/0047975 A1* | 3/2007 | Dan | ..................... | G03G 15/655 399/8 |
| 2009/0190164 A1* | 7/2009 | Kumagai | ........... | H04N 1/32133 358/1.15 |
| 2011/0075208 A1* | 3/2011 | Ueda | .................. | H04N 1/00222 358/1.15 |
| 2011/0242580 A1* | 10/2011 | Tran | ..................... | G06F 3/1205 358/1.15 |

(Continued)

FOREIGN PATENT DOCUMENTS

JP 2012-217086 A 11/2012

*Primary Examiner* — Kent Yip
(74) *Attorney, Agent, or Firm* — Canon U.S.A., Inc. IP Division

(57) ABSTRACT

A printing apparatus comprising a printing unit configured to print an image, and a controlling unit including a processor and a memory storing a program which executed by the processor, the controlling being configured to act as a receiving unit configured to receive print data generated by an external apparatus, and a causing unit configured to cause the printing unit to print user information described in the received print data on a sheet together with an image of the print data, and configured to cause the printing unit to print user information described in setting information received by the receiving unit together with the received print data on a sheet together with an image of the print data.

20 Claims, 10 Drawing Sheets

(56) References Cited

U.S. PATENT DOCUMENTS

2012/0133972 A1\* 5/2012 Hayashi ............ H04N 1/32149
　　　　　　　　　　　　　　　　　　　　　358/1.15

\* cited by examiner

FIG.7A

```
< JDF ID="ID01" Type="Combined" JobPartID="JobPartID01"
Types="LayoutPreparation Imposition Interpreting Rendering DigitalPrinting"
Activation="Active" Status="Ready" Version="1.4" Category="DigitalPrinting"
ICSVersions="IDP_L1-1.0 Base_L1-1.0" MaxVersion="1.4"
xmlns="http://www.CIP4.org/JDFSchema_1_1"
xmlns:cj="http://www.canon.com/ns/CanonJDF"
JobID="JobID01" DescriptiveName="JobName" OwnerName="SSaito" >
```
~701

FIG.7B

```
HPC2015-B4
PSSaito
fdfA011PC2015-B4
UdfA011PC2015-B4
NPatentDocuments.pdf
```
~702

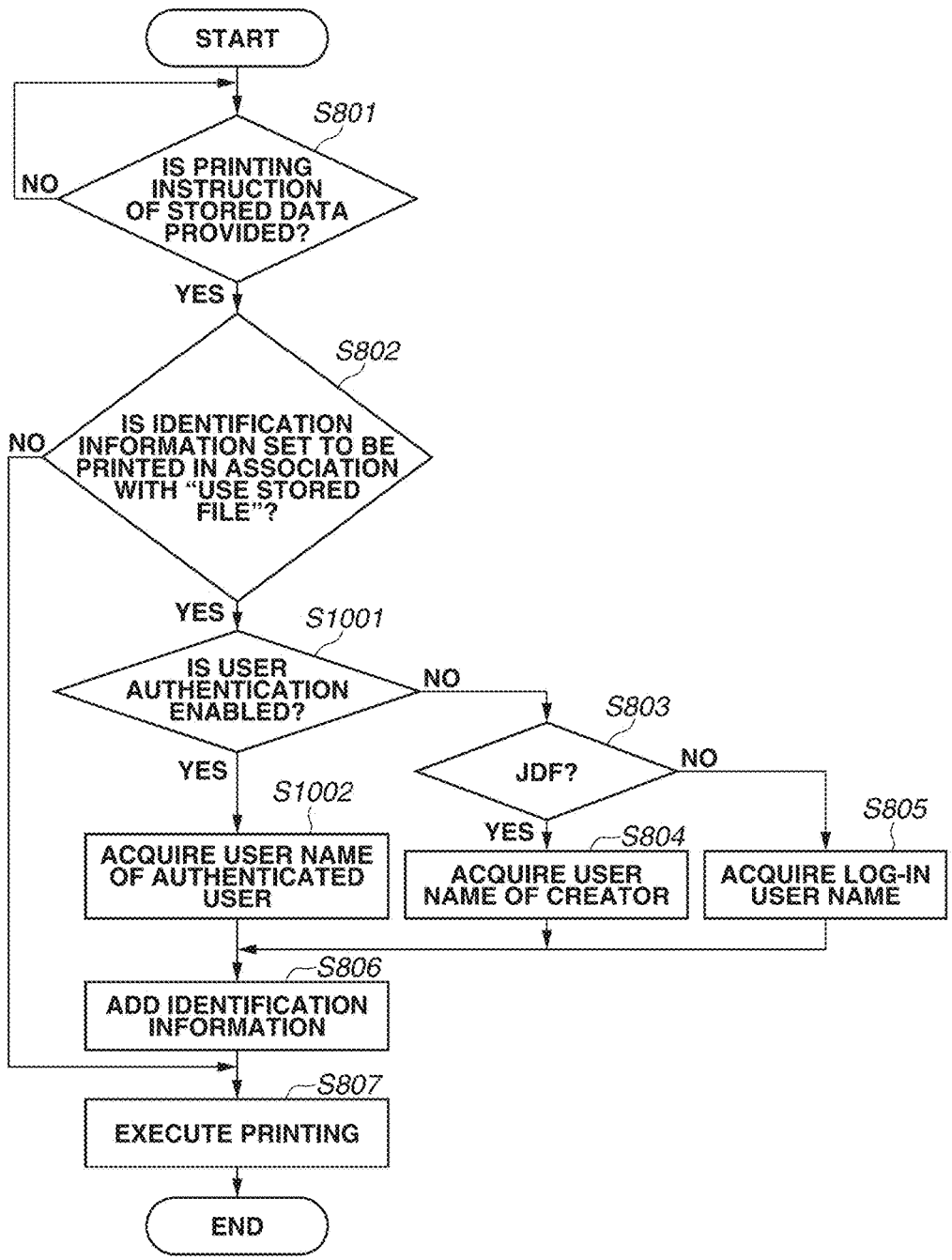

PRINTING APPARATUS AND CONTROL METHOD OF PRINTING APPARATUS

BACKGROUND OF THE INVENTION

Field of the Invention

The present invention relates to a printing apparatus capable of adding user information to an image of a printing target.

Description of the Related Art

Conventionally, there has been known a technique for printing an image of a printing target after adding information thereto. Japanese Patent Application Laid-Open No. 2012-217086 discusses a technique for adding characters such as "CONFIDENTIAL" or "IMPORTANT", or information such as a creation date of a printed material.

Further, in recent years, there has been known a technique of adding user information indicating a printer (i.e., a user who has provided a printing instruction) to an image as a printing target. This enables a user to identify who has provided a printing instruction, from a printed material later.

When a copy job for which an acquired image is printed on a sheet by reading an image on a document through a scanner included in a printing apparatus is to be executed, user information indicating a user authenticated by the printing apparatus is used as the user information that indicates a printer. The authentication in a printing apparatus is executed in order to identify a user who is about to use the printing apparatus.

On the other hand, when a print job for which print data generated by an external apparatus is received and an image is printed on a sheet based on the received print data is to be executed, it is often the case that a user does not operate the printing apparatus. In such a case, adding the user information indicating a user logging in the external apparatus (i.e., adding the information indicating a user authenticated by the external apparatus) may be considered instead of adding the user information indicating a user authenticated by the printing apparatus.

However, depending on the type of print data, the user information indicating a user logging in the external apparatus may not be included in the print data. More specifically, the user information indicating a user logging in the external apparatus is included in the print data generated in accordance with a page description language (PDL) by a printer driver installed in the external apparatus. However, the user information indicating a user logging in the external apparatus is not included in the print data generated in accordance with a job definition format (JDF).

Accordingly, when printing is executed based on the print data generated in accordance with the JDF, the user information to be added to an image cannot be acquired. In this case, if printing is executed without adding the user information, it will be very difficult to identify who has printed the printed material.

SUMMARY OF THE INVENTION

According to an aspect of the present invention, a printing apparatus includes a receiving unit configured to receive print data generated by an external apparatus, and a printing unit configured to print user information described in the received print data on a sheet together with an image based on the print data, or to print user information described in setting information received by the receiving unit together with the received print data on a sheet together with an image generated based on the print data.

Further features of the present invention will become apparent from the following description of exemplary embodiments with reference to the attached drawings.

BRIEF DESCRIPTION OF THE DRAWINGS

FIGS. 7A and 7B are diagrams illustrating examples of user information included in print data according to an exemplary embodiment of the present invention.

FIG. 10 is a flowchart illustrating an operation of the printing apparatus according to an exemplary embodiment of the present invention.

DESCRIPTION OF THE EMBODIMENTS

Hereinbelow, exemplary embodiments according to the present invention will be described in detail with reference to the appended drawings. In addition, the embodiments described below are not intended to limit the content of the invention according to the appended claims, and not all of the combinations of features described in the exemplary embodiments are required as the solutions of the present invention.

Figure 1:
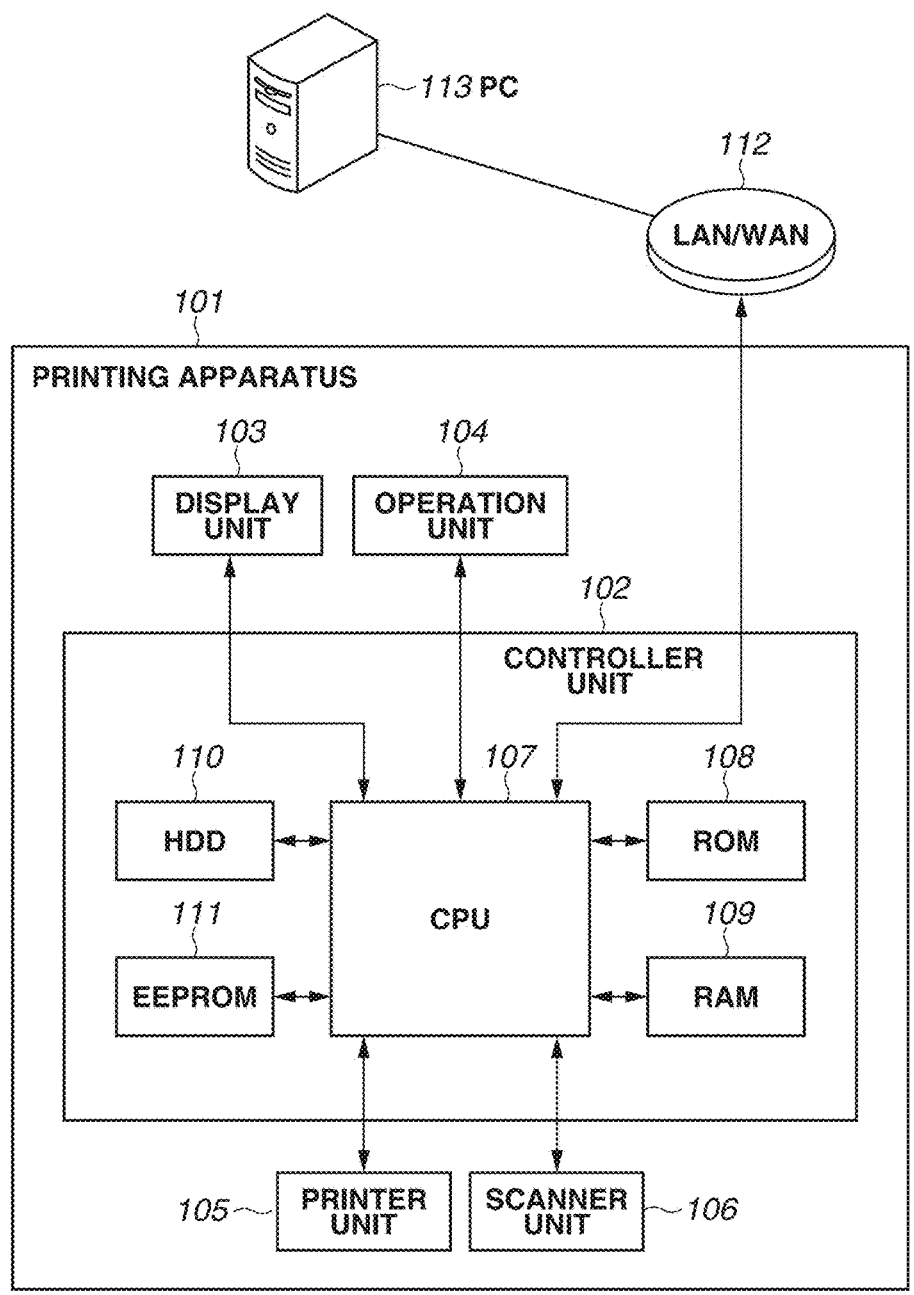
FIG. 1 is a block diagram illustrating an entire system including a printing apparatus according to an exemplary embodiment of the present invention.

FIG. 1 is a block diagram illustrating an entire system including a printing apparatus 101 as an example of the printing apparatus according to a first exemplary embodiment. The printing apparatus 101 includes a controller unit 102, a display unit 103, an operation unit 104, a printer unit 105, and a scanner unit 106. The display unit 103 includes a light-emitting diode (LED) or a liquid crystal display, so as to display contents of a user operation or an internal state of the printing apparatus 101. The operation unit 104 receives a user operation through a group of hardware keys or a touch panel function of the display unit 103.

The printer unit 105 receives a printing instruction from the controller unit 102 and prints an image on a sheet based on image data transmitted from the controller unit 102. The scanner unit 106 receives a reading instruction from the controller unit 102 to read an image on a document, and transmits acquired image data to the controller unit 102. In addition, the printer unit 105 can execute printing based on the image data generated by the scanner unit 106 (i.e., copy job).

The controller unit 102 includes a central processing unit (CPU) 107, a read only memory (ROM) 108, a random access memory (RAM) 109, a hard disk drive (HDD) 110, and an electrically erasable programmable read only memory (EEPROM) 111. The CPU 107 serves as an execution medium of a control program included in the printing apparatus 101 and controls operations of devices connected to the controller unit 102 via respective interfaces (I/F) or a memory of a storage medium. The ROM 108 is a read only memory for storing a boot program necessary for activating the system. The RAM 109 is a volatile memory to be used as a work memory when the control program is executed.

The HDD 110 is a storage medium such as a magnetic disk for storing the control program or image data. The EEPROM 111 is a non-volatile memory for storing setting values necessary for executing the control program.

The CPU 107 receives page description language (PDL) data from a personal computer (PC) 113 serving as an external apparatus via a local area network (LAN)/wide area network (WAN) 112, and controls the printer unit 105 to execute printing based on the received PDL data (i.e., PDL job). The PDL data is generated by a printer driver installed in the PC 113 serving as a host computer.

Figure 2A:
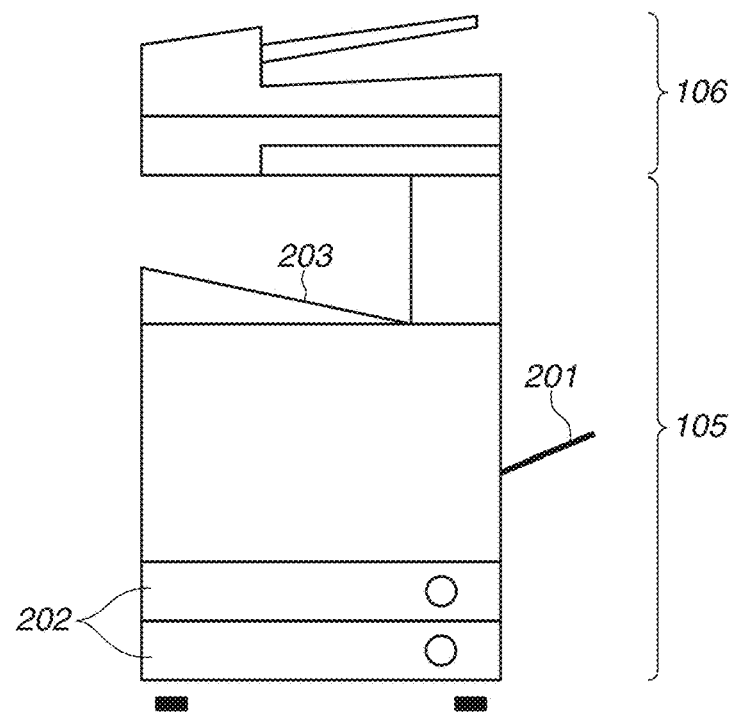
FIGS. 2A and 2B are diagrams illustrating an external view and a conveyance path of the printing apparatus according to an exemplary embodiment of the present invention.

FIG. 2A is a diagram illustrating an external view of the printing apparatus 101. The lower portion of housing of the printing apparatus 101 corresponds to the printer unit 105, and the upper portion of housing thereof corresponds to the scanner unit 106. A manual feed tray 201 and a cassette 202 are provided as supplying sources of the sheets used for printing. Further, a discharge tray 203 is provided as a discharge destination of the sheets on which images have been printed.

Figure 2B:
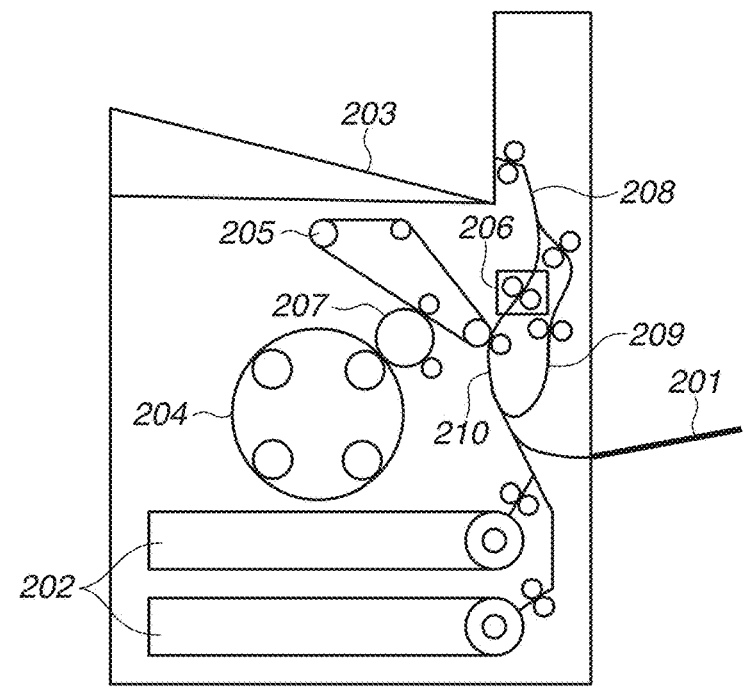

FIG. 2B is a diagram illustrating a sheet conveyance path provided inside of the printer unit 105. A photosensitive drum 207 is charged with specific polar potential and exposed to light by an exposure unit (not illustrated). With this processing, an electrostatic latent image is formed on the photosensitive drum 207. Thereafter, toner is applied onto the photosensitive drum 207 by a development unit 204, so that an image is developed thereon.

The image developed on the photosensitive drum 207 is transferred to an intermediate transfer belt 205, and transferred onto a sheet conveyed to a conveyance path 210 from the manual feed tray 201 or the cassette 202. The sheet on which the image has been transferred is conveyed to a fixing unit 206, so that fixing processing is executed by applying heat and pressure thereto. When one-sided printing is executed, the sheet on which the image has been fixed is discharged to the discharge tray 203 via the conveyance path 208 with its printed surface facing downward. When two-sided printing is executed, the sheet is inverted at in conveyance path 208 and supplied to the conveyance path 210 again via the conveyance path 209. In the two-sided printing mode, printing is firstly executed on a back surface of the sheet, and the sheet is discharged with its front surface facing downward.

Figure 3:
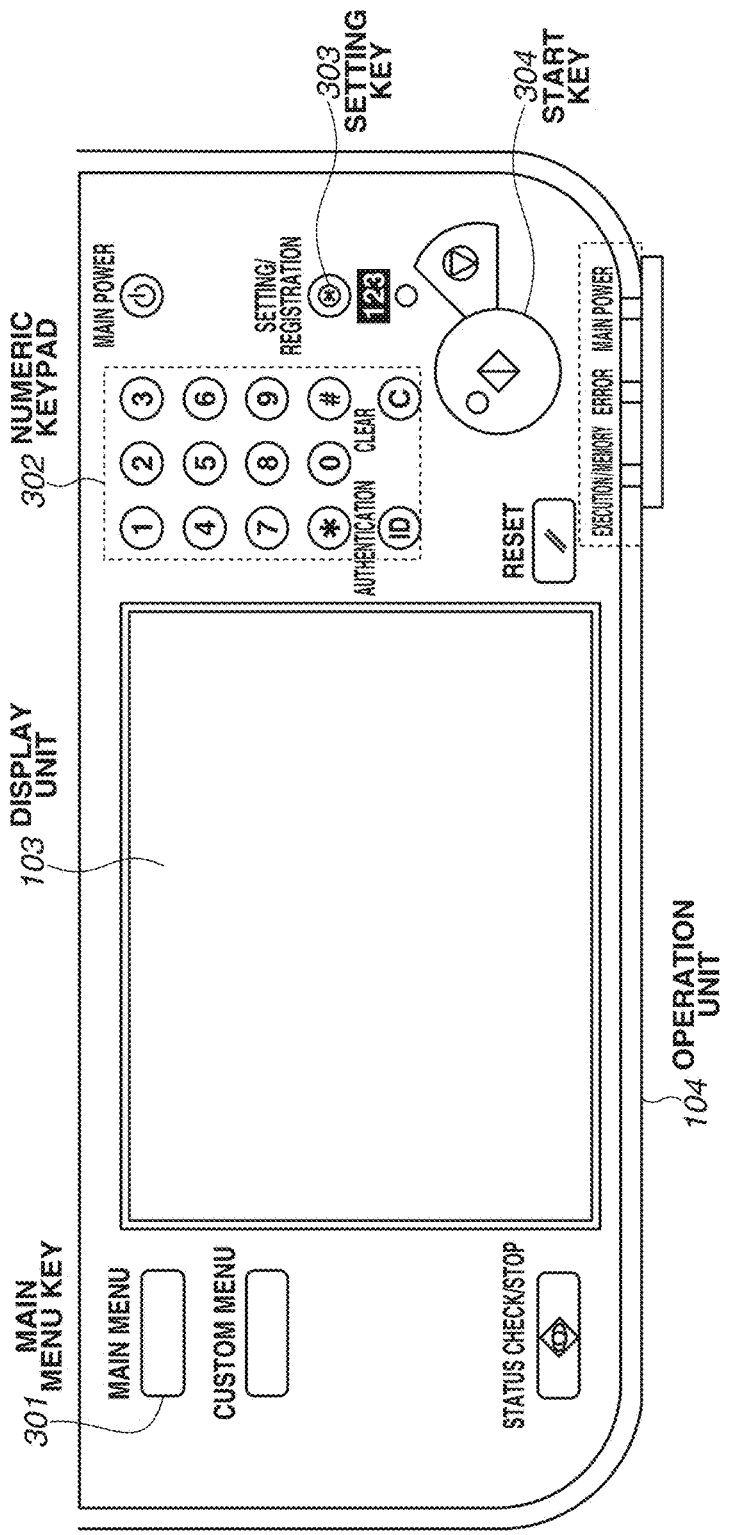
FIG. 3 is a diagram illustrating an external view of an operation unit of the printing apparatus according to an exemplary embodiment of the present invention.

FIG. 3 is a diagram illustrating an external view of the operation unit 104 including the display unit 103. A main menu key 301 is used to display a main menu on the display unit 103. A user inputs numerical values through numerical keypads 302. A setting key 303 is pressed when various settings with respect to the entire unit of the printing apparatus 101 are executed. A start key 304 is pressed when execution of processing such as printing is instructed.

Figure 4A:
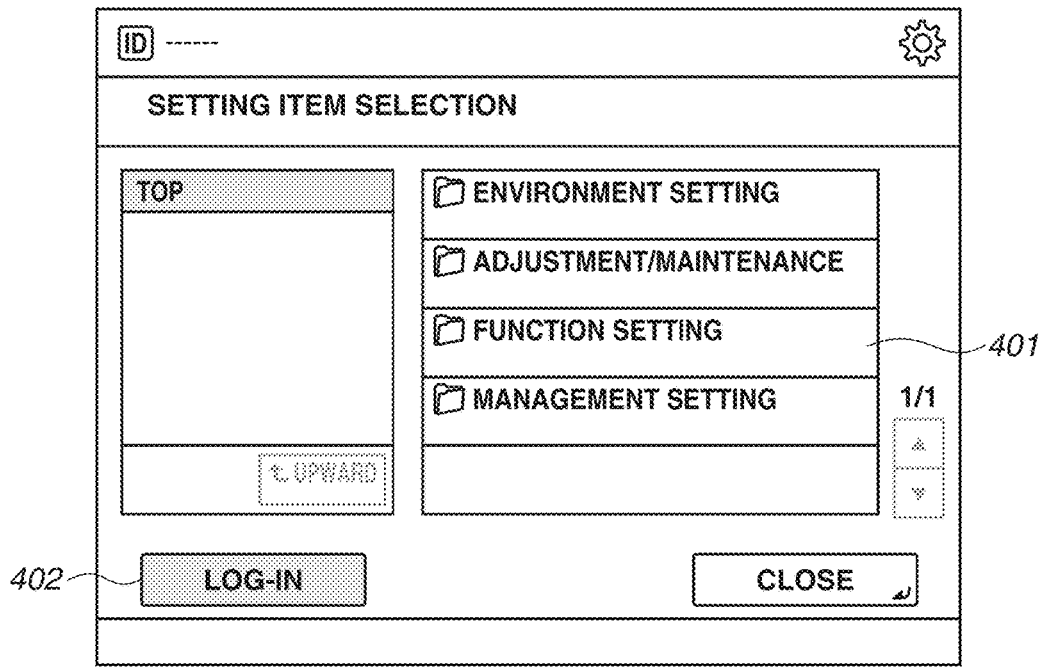
FIGS. 4A and 4B are diagrams illustrating examples of screens displayed on a display unit of the printing apparatus according to an exemplary embodiment of the present invention.

FIG. 4A is a diagram illustrating an operation screen displayed on the display unit 103 when the setting key 303 is pressed. A user can execute various settings through respective screens further shifted from this screen.

Figure 4B:
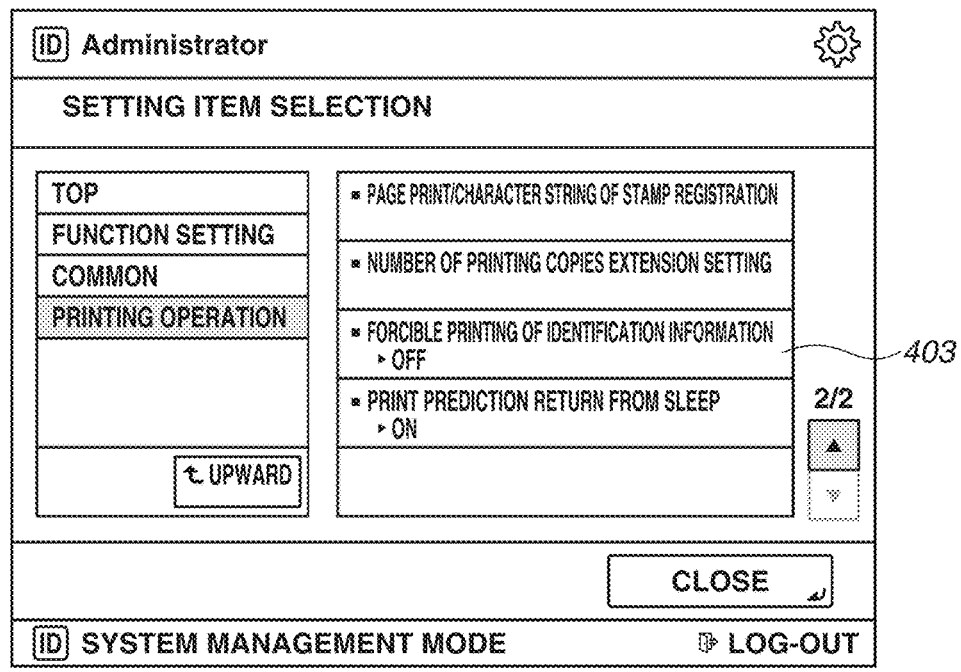

FIG. 4B is a diagram illustrating an operation screen displayed on the display unit 103 when an item 401 called "FUNCTION SETTING" is selected on the operation screen illustrated in FIG. 4A. This screen includes an item 403 called "FORCIBLE PRINTING OF IDENTIFICATION INFORMATION". In addition, because the item 403 can be set only by an administrator of the printing apparatus 101, the item 403 is displayed in gray-out manner when the operation unit 104 is operated by a general user. The user has to be authenticated as an administrator by pressing a log-in key 402 of FIG. 4A in order to perform setting with respect to the item 403.

Figure 5:
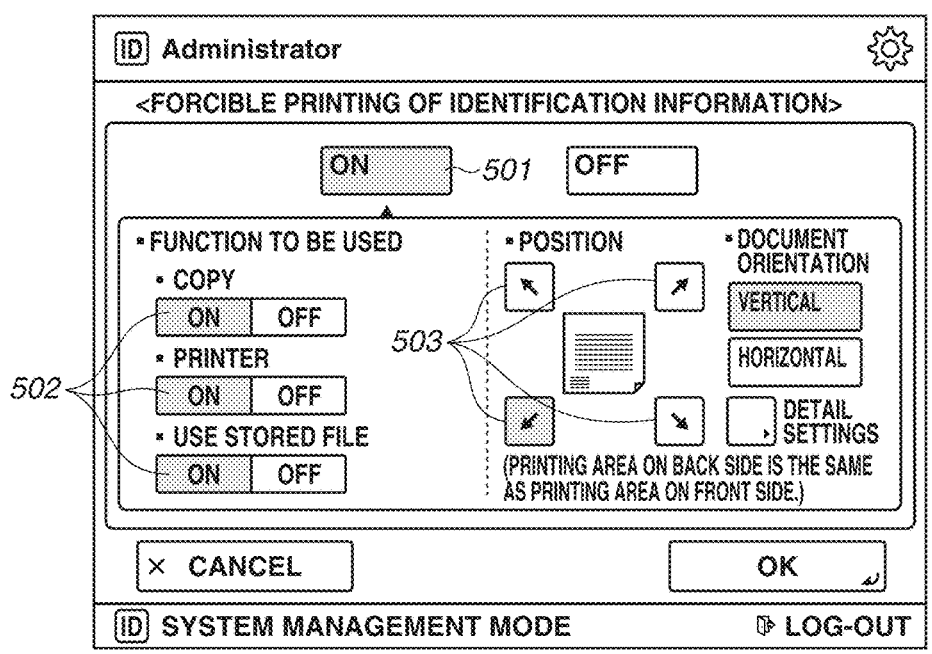
FIG. 5 is a diagram illustrating an example of a screen displayed on the display unit of the printing apparatus according to an exemplary embodiment of the present invention.

FIG. 5 is a diagram illustrating an operation screen displayed on the display unit 103 when the item 403 illustrated in FIG. 4B is selected. On this screen, the user can perform print setting of identification information. Herein, the identification information includes user information as well as information such as printing date/time, an internet protocol (IP) address of the printing apparatus 101, and a serial number of the printing apparatus 101. By forcibly adding (printing) the user information, it is possible to identify who has executed printing from a printed material later.

The user presses an ON key 501 to print the identification information. Keys 502 are a group of keys used for setting whether to print the identification information for each of the functions. "COPY" is a function for printing an image read from a document by the scanner unit 106 on a sheet by the printer unit 105. When a setting with respect to "COPY" is turned "ON", the user information indicating a user authenticated by the printing apparatus 101 is added as the identification information.

"PRINTER" is a function for printing an image on a sheet by the printer unit 105, based on the print data received from an external apparatus such as the PC 113. When a setting corresponding to "PRINTER" is turned "ON", user information is added as the identification information through the processing described below with reference to FIG. 6. "USE STORED FILE" is a function for storing print data received from an external apparatus such as the PC 113 in the HDD 110 temporarily, and then according to an instruction from the user, printing an image on a sheet based on the print data. When a setting corresponding to "USE STORED FILE" is turned "ON", user information is added as the identification information through the processing described below with reference to FIG. 8.

Keys 503 are a group of keys used for selecting a region where the identification information is to be printed. The identification information can be printed in any of four regions, i.e., an upper-right, a lower-right, an upper-left, and a lower-left regions of the image. The content set by using the respective keys in FIG. 5 is stored in the EEPROM 111.

Figure 6:
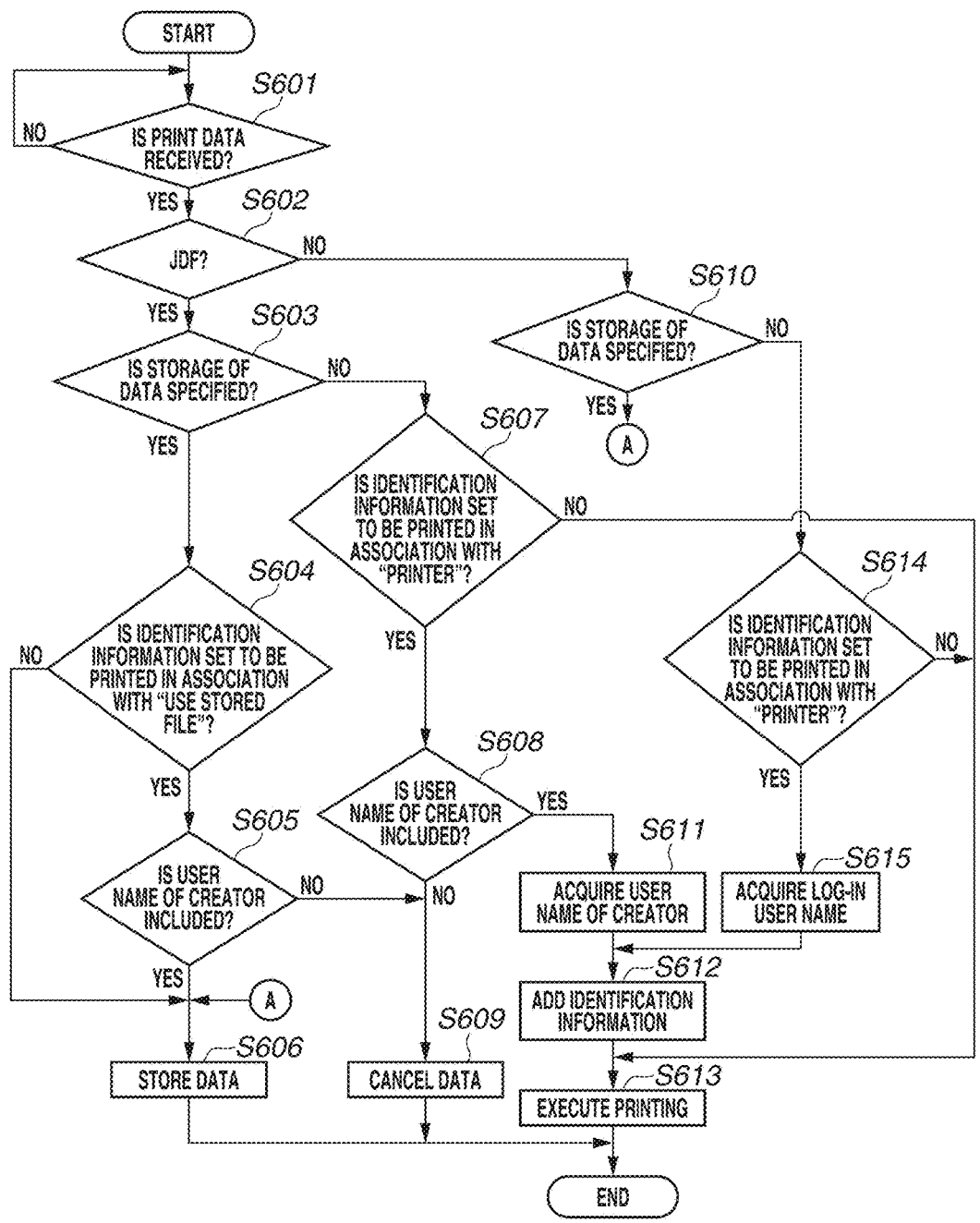
FIG. 6 is a flowchart illustrating an operation of the printing apparatus according to an exemplary embodiment of the present invention.

FIG. 6 is a flowchart illustrating an operation of receiving print data. Each step illustrated in the flowchart of FIG. 6 is realized by the CPU 107 of the printing apparatus 101 executing the control program stored in the ROM 108.

In step S601, the CPU 107 determines whether print data is received from an external apparatus such as the PC 113. If the print data is received (YES in step S601), the processing proceeds to step S602. In step S602, the CPU 107 determines a type of the received print data. If the received print data is data generated in accordance with the JDF (YES in step S602), the processing proceeds to step S603. If the received data is data generated in accordance with the PDL (NO in step S602), the processing proceeds to step S610.

In step S603, the CPU 107 determines whether storage of print data is specified. If storage of print data is specified, print data is temporarily stored in the HDD 110 without being printed when the print data is received, and printing is executed upon receipt of an instruction from the user. If storage of print data is specified (YES in step S603), the processing proceeds to step S604. On the other hand, if storage of print data is not specified (NO in step S603), the processing proceeds to step S607.

In step S604, with reference to the information stored in the EEPROM 111, the CPU 107 determines whether identification information is set to be printed in association with the function "USE STORED FILE". As a result of the determination, if identification information is set to be printed (YES in step S604), the processing proceeds to step S605. On the other hand, if identification information is not set to be printed (NO in step S604), the processing proceeds to step S606.

In step S605, the CPU 107 determines whether a user name of a creator of the JDF data is included in the received print data. The JDF data is an operation process manual described in an extensible markup language (XML) format, in which setting information relating to the print job is defined. As described above, because the purpose of printing the user information as the identification information is to enable a user to identify who has executed printing later, normally, it is desirable that a person who has provided a printing instruction be indicated thereby. However, the information indicating a user who has directly provided a printing instruction is not included in the print data generated in accordance with the JDF. In this case, although the identification information is set to be printed, the image is printed without adding the identification information, and thus it is not possible to identify the printer.

Therefore, the printing apparatus 101 adds the user information indicating a creator of the JDF data instead of the information indicating a user who has provided the printing instruction. Because the JDF data is shared by a plurality of users, a creator of the JDF data does not directly refer to a user who has provided a printing instruction. However, the user information indicating a creator of the JDF data can be used as a clue for identifying the user who has provided the printing instruction.

FIG. 7A is a diagram illustrating an example of an extracted portion of JDF data. In this example 701, a name of the print job is "JobName", whereas a creator of the JDF data is "SSaito". A user name that indicates the creator is defined by an attribute "OwnerName". In addition, job messaging format (JMF) data may be used when the print data is generated in accordance with JDF data, and thus a user name indicating a creator of setting information may be included in the JMF data. Accordingly, the user name indicating a creator may be acquired from the JMF data. Further, since there is a case where the user name of the creator of the JDF data is not described, determination processing will be executed in step S605 (and step S608 described below).

In the determination in step S605, if the user name of the creator of the JDF data is included (YES in step S605), the processing proceeds to step S606. In step S606, the received print data is stored in the HDD 110, and the processing is ended. On the other hand, if the user name of the creator of the JDF data is not included (NO in step S605), the processing proceeds to step S609. In step S609, the received print data is cancelled (or discarded) because it is not possible to execute printing with the identification information added thereto even if the received print data is stored in the HDD 110. At this time, the PC 113 may be notified of the cancellation.

In step S607, with reference to the information stored in the EEPROM 111, the CPU 107 determines whether identification information is set to be printed in association with the function "PRINTER". As a result of the determination, if identification information is set to be printed (YES in step S607), the processing proceeds to step S608. On the other hand, if identification information is not set to be printed (NO in step S607), the processing proceeds to step S613. In a case where the processing proceeds to step S613, the image is printed without adding the identification information.

Similar to the processing in step S605, in step 608, the CPU 107 determines whether a user name of the creator of the JDF data is included. If the user name of the creator of the JDF data is included (YES in step S608), the processing proceeds to step S611. In step S611, a user name 701 of the creator is acquired. Then, in step S612, the identification information including the acquired user name is added to the image of a printing target, and printing is executed in step S613. On the other hand, if the user name of the creator of the JDF data is not included (NO in step S608), the processing proceeds to step S609. In step S609, the received print data is cancelled (or discarded) because it is not possible to execute printing with the identification information added thereto. At this time, the PC 113 may be notified of the cancellation.

In step S610, similar to the processing in step S603, the CPU 107 determines whether storage of print data is specified. If storage of print data is specified (YES in step S610), the processing proceeds to step S606. In step S606, the received print data is stored in the HDD 110, and the processing is ended. Herein, determination similar to the determination described in step S605 is not executed because a user name of the user who logs in the PC 113 is always included in the print data generated in accordance with the PDL.

FIG. 7B is a diagram illustrating an example of an extracted portion of the PDL data. In this example 702, a name of the PC 113 is "PC2015-B4", and a user name of the user who has provided the printing instruction is "SSaito".

As a result of the determination in step S610, if storage of print data is not specified (NO in step S610), the processing proceeds to step S614. In step S614, with reference to the information stored in the EEPROM 111, the CPU 107 determines whether identification information is set to be printed in association with the function "PRINTER". As a result of the determination, if identification information is set to be printed (YES in step S614), the processing proceeds to step S615. On the other hand, if identification information is not set to be printed (NO in step S614), the processing proceeds to step S613. In step S613, the image is printed without adding the identification information.

In step S615, the CPU 107 acquires a user name 702 of a log-in user of the PC 113. Then, in step S612, the identification information including the acquired user name is added to the image as a printing target, and printing is executed in step S613.

Figure 8:
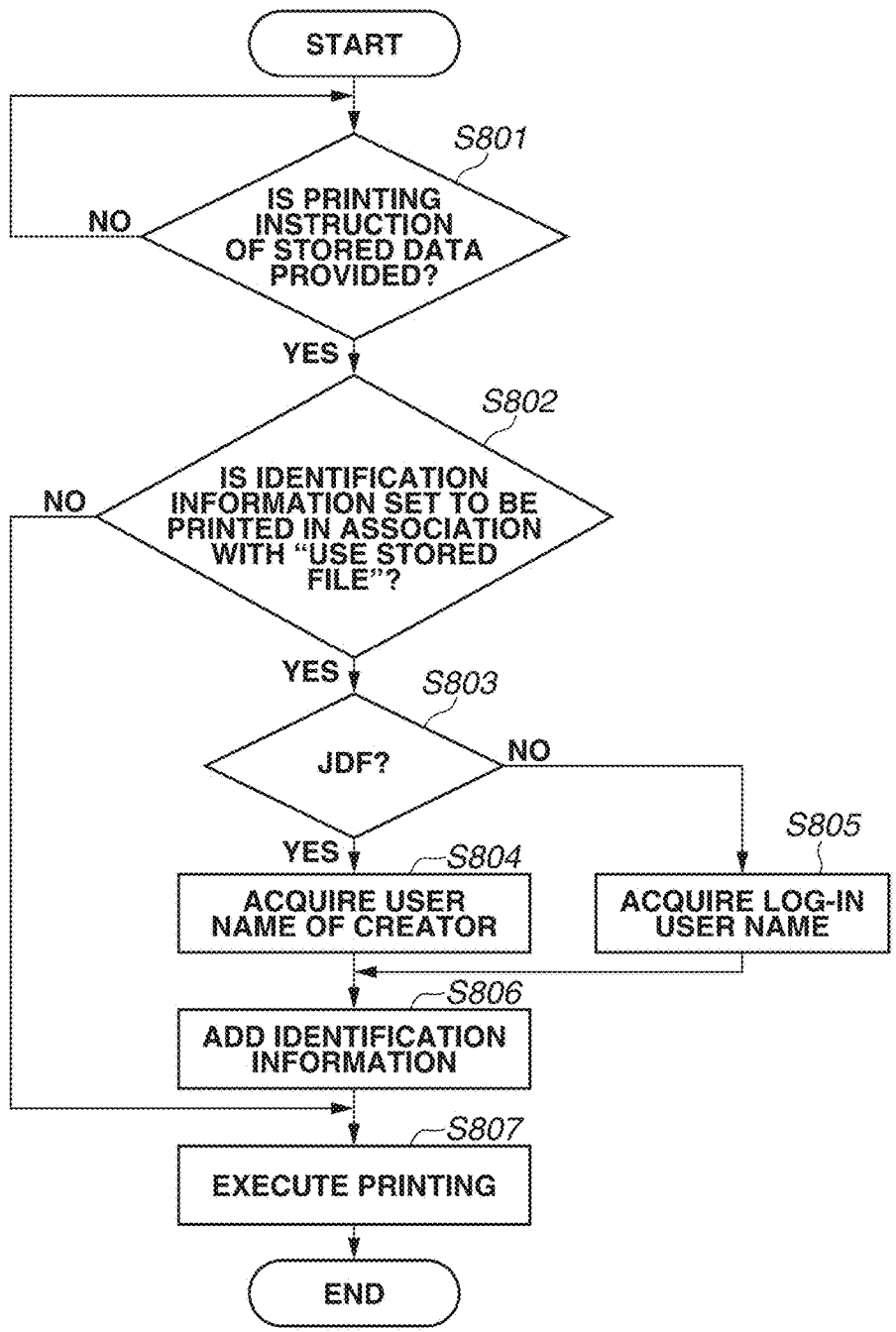
FIG. 8 is a flowchart illustrating an operation of the printing apparatus according to an exemplary embodiment of the present invention.

FIG. 8 is a flowchart illustrating an operation of executing printing based on the print data stored in the HDD 110. Each step illustrated in the flowchart of FIG. 8 is realized when the CPU 107 of the printing apparatus 101 executes the control program stored in the ROM 108.

In step S801, the CPU 107 determines whether execution of printing based on the print data stored in the HDD 110 is instructed. A user (i.e., a user of the printing apparatus 101) can provide an instruction for executing printing by selecting the print data of a printing target from a list displayed on the display unit 103. If the execution of printing based on the print data stored in the HDD 110 is instructed (YES in step S801), the processing proceeds to step S802.

In step S802, with reference to the information stored in the EEPROM 111, the CPU 107 determines whether identification information is set to be printed in association with the function "USE STORED FILE". As a result of the determination, if the identification information is set to be printed (YES in step S802), the processing proceeds to step S803. On the other hand, if the identification information is not set to be printed (NO in step S802), the processing proceeds to step S807. In step S807, the image is printed without adding the identification information.

In step S803, the CPU 107 determines a type of received print data. If the received print data is data generated in accordance with the JDF (YES in step S803), the processing proceeds to step S804. If the received data is data generated in accordance with the PDL (NO in step S803), the processing proceeds to step S805. In step S804, the CPU 107 acquires a user name 701 of the creator. In step S805, the CPU 107 acquires a user name 702 of a log-in user of the PC 113d. In step S806, the identification information including the user name acquired in step S804 or S805 is added to the image as a printing target, and printing is executed in step S807.

As described above, the printing apparatus 101 acquires the user information indicating a user logging in the PC 113 from the print data if the received print data is data generated in accordance with the PDL. On the other hand, if the received print data is data generated in accordance with the JDF, the printing apparatus 101 acquires the user information indicating a creator of the setting information for executing printing based on the print data from that print data. Then, printing is executed after adding any of the user information to the image of a printing target according to the type of the received print data. With this processing, the user information is added to the image of a printing target with certainty.

Next, a second exemplary embodiment of the present invention will be described. In the first exemplary embodiment, as a result of the determination in step S604, the processing proceeds to step S605 if the identification information is set to be printed, and the printing is cancelled if the user name of the creator of the JDF data is not included. However, when the print data is temporarily stored in the HDD 110, the printing apparatus 101 has to be operated by the user. Accordingly, if the user has to be authenticated by the printing apparatus 101 in order to operate the printing apparatus 101 (i.e., if the user authentication function is enabled), the user can be identified through the authentication. Therefore, in a case where the identification information is set to be printed as a result of the determination in step S604 if the user authentication function of the printing apparatus 101 is enabled, the print data is stored without being cancelled even if a user name of the creator of the JDF data is not included.

Figure 9:
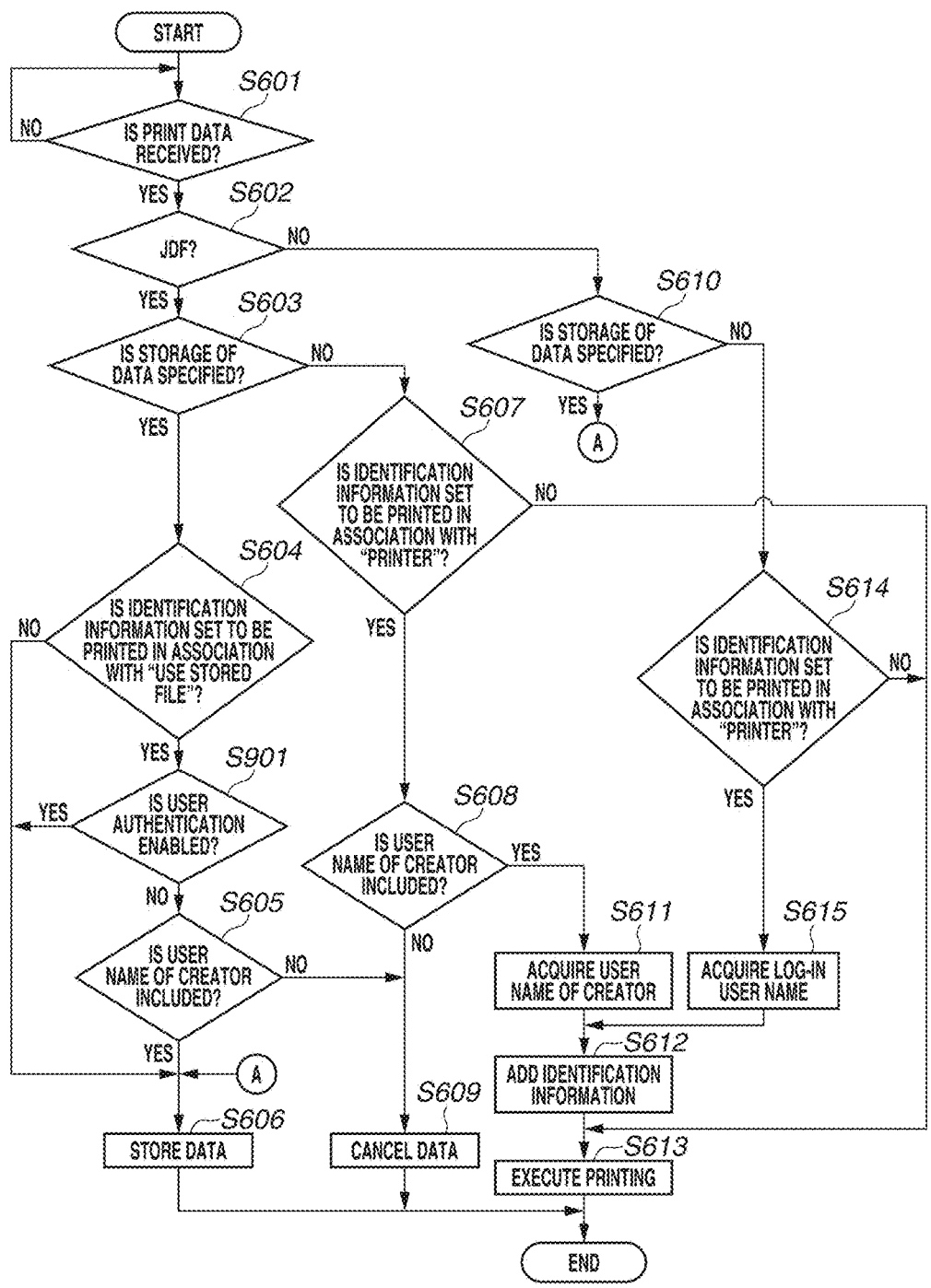
FIG. 9 is a flowchart illustrating an operation of the printing apparatus according to an exemplary embodiment of the present invention.

FIG. 9 is a flowchart illustrating an operation of receiving print data, which is executed instead of the operation illustrated in the flowchart of FIG. 6. Each step illustrated in the flowchart of FIG. 9 is realized when the CPU 107 of the printing apparatus 101 executes the control program stored in the ROM 108.

Compared the flowchart of FIG. 9 to that of FIG. 6, it is found that the processing proceeds to step S901 from step S604 in a case where the identification information is set to be printed (YES in step S604) as a result of the determination in step S604. In step S901, the CPU 107 determines whether the user authentication function of the printing apparatus 101 is enabled. If the user authentication function is enabled (YES in step S901), the processing proceeds to step S606. In step S606, the received print data is stored in the HDD 110, and the processing is ended. On the other hand, if the user authentication function is disabled (NO in step S901), the processing proceeds to step S605. In addition, respective steps other than the steps described in the present exemplary embodiment are similar to those described in FIG. 6.

FIG. 10 is a flowchart illustrating an operation of executing printing based on the print data stored in the HDD 110, which is to be executed instead of the operation illustrated in the flowchart of FIG. 8. Each step illustrated in the flowchart of FIG. 10 is realized when the CPU 107 of the printing apparatus 101 executes the control program stored in the ROM 108.

Comparing the flowchart of FIG. 10 to that of FIG. 8, it is found that the processing proceeds to step S1001 from step S802 in a case where the identification information is set to be printed (YES in step S802) as a result of the determination in step S802. In step S1001, the CPU 107 determines whether the user authentication function of the printing apparatus 101 is enabled. If the user authentication function is enabled (YES in step S1001), the processing proceeds to step S1002. In step S1002, the CPU 107 acquires a user name of the user authenticated by the user authentication function of the printing apparatus 101. Then, the processing proceeds to step S806 from step S1002, and the identification information including the user name acquired in step S1002 is added to the image of a printing target. Then, in step S807, printing is executed.

On the other hand, as a result of the determination in step S1001, if the user authentication function is disabled (NO in step S1001), the processing proceeds to step S803. In addition, respective steps other than the steps described in the present exemplary embodiment are similar to those described in FIG. 8. However, there may be a case where the user authentication function is disabled when determination is executed in step S1001 of FIG. 10 although the user authentication function has been enabled when determination is executed in step S901 of FIG. 9. In this case, if the user name of the creator of the JDF data is not included, the user name of the creator cannot be acquired in step S804, and thus the printing will be cancelled.

As described above, according to the present exemplary embodiment, in a case where print data is temporarily stored in the HDD 110 and if user authentication is executed by the printing apparatus 101, user information that can be acquired as a result of the user authentication executed by the printing apparatus 101 is added to the image of a printing target. With this processing, it is possible to increase chances of printing an image to which identification information has been added while reducing chances of cancelling the printing thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-168290, filed Aug. 27, 2015, which is hereby incorporated by reference herein in its entirety.

What is claimed is:

1. A printing apparatus for printing an image on a sheet, comprising:
   a printing unit; and
   a controlling unit including a processor and a memory storing a program which when executed by the processor causes the controlling unit to control the printing apparatus to:
   receive print job data from an external apparatus, the print job data including data of the image and job definition format data;
   store a setting indicating whether to print, on the sheet, user identification information for identifying a user, together with the image;
   determine whether the user identification information is included in the received job definition format data; and
   when the print job data is received in a state where a setting for printing, on the sheet, the user identification information together with the image is stored,
   (1) if it is determined that the user identification information is included in the received job definition format data, print, by the printing unit, the image and the user identification information included in the received job definition format data, on the sheet, and
   (2) if it is determined that the user identification information is not included in the received job definition format data, cancel printing based on the received print job.

2. The printing apparatus according to claim 1, wherein the controlling unit is configured to control the printing apparatus to:
   receive page description language data from another external apparatus, the page description language data including information identifying a user who has logged in the another external apparatus;
   acquire, from the received page description language data, the information identifying the user who logged in the another external apparatus; and
   print an image and the acquired information on the sheet when the print job data is received in a state where the setting for printing, on the sheet, the user identification information together with the image is stored.

3. The printing apparatus according to claim 1, wherein the job definition format data is possible to be used by a plurality of users and the user identified by the user identification information may be different from a user who has instructed the printing.

4. The printing apparatus according to claim 1, wherein the determining is performed by searching the received job definition format data for a predetermined character string and retrieving, as the user identification information, another character string subsequent to the predetermined character string.

5. The printing apparatus according to claim 1, wherein the controlling unit is configured to control the printing apparatus to:
   search the received job definition format data to find a predetermined character string;
   if the predetermined character string is found, retrieve, as the user identification information, another character string subsequent to the predetermined character string; and
   if the predetermined character string is not found, cancel printing the image.

6. The printing apparatus according to claim 1, further comprising a storage, wherein the controlling unit is configured to control the printing apparatus to:
   store the received print job data into the storage; and
   accept, from a user, an instruction to start printing for the stored print job data,
   wherein, according to the instruction accepted from the user, the acquiring and the printing is performed.

7. The printing apparatus according to claim 1, further comprising a storage, wherein the controlling unit is further configured to control the printing apparatus to:
   store the received print job data into the storage;
   authenticate a user of the printing apparatus;
   accept, from the user, an instruction to start printing for the stored print job data; and
   according to the instruction accepted from the user, acquire user identification information for identifying the authenticated user and print, by the printing unit, the image and the acquired user identification information.

8. The printing apparatus according to claim 1, wherein the job definition format data is described in an XML (extensible markup language), and the information identifying the user is indicated by a predetermined attribute described in the XML.

9. A method of controlling a printing apparatus for printing an image on a sheet, comprising:
   receiving print job data from an external apparatus, the print job data including data of the image and job definition format data;

storing a setting indicating whether to print, on the sheet, user identification information for identifying a user, together with the image;

determining whether the user identification information is included in the received job definition format data;

when the print job data is received in a state where a setting for printing, on the sheet, the user identification information together with the image is stored, (1) if it is determined that the user identification information is included in the received job definition format data, printing the image and the user identification information included in the received job definition format data on the sheet, and (2) if it is determined that the user identification information is not included in the received job definition format data, cancelling printing based on the received print job.

10. The method according to claim 9, further comprising:
receiving page description language data from another external apparatus, the page description language data including information identifying a user who has logged in the another external apparatus;

acquiring, from the received page description language data, the information identifying the user who logged in the another external apparatus; and printing an image and the acquired information on the sheet when the print job data is received in a state where the setting for printing, on the sheet, the user identification information together with the image is stored.

11. The method according to claim 9, wherein the job definition format data is possible to be used by a plurality of users and the user identified by the user identification information may be different from a user who has instructed the printing.

12. The method according to claim 9, wherein the determining includes:
searching the received job definition format data for a predetermined character string; and retrieving, as the user identification information, another character string subsequent to the predetermined character string.

13. The method according to claim 9, further comprising:
searching the received job definition format data to find a predetermined character string;

if the predetermined character string is found, retrieving, as the user identification information, another character string subsequent to the predetermined character string and performing the printing; and if the predetermined character string is not found, cancelling printing the image.

14. The method according to claim 9, wherein the job definition format data is described in an XML (extensible markup language), and the user identification information is indicated by a predetermined attribute described in the XML.

15. The method according to claim 9, further comprising:
printing the image without printing the user identification information even if the user identification information is included in the received job definition format data when the print job data is received in a state where a setting for not printing, on the sheet, the user identification information together with the image is stored.

16. The method according to claim 15, further comprising:
not cancelling printing based on the print job data even if the user identification information is not included in the received job definition format data when the print job data is received in a state where the setting for not printing, on the sheet, the user identification information together with the image is stored.

17. The method according to claim 16, wherein the setting indicating whether to print, on the sheet, the user identification information together with the image is settable for each job type.

18. The method according to claim 9, further comprising:
receiving, from the user, a setting indicating whether to print, on the sheet, the user identification information together with the image; and storing the received setting.

19. The method according to claim 18, wherein the setting indicating whether to print, on the sheet, the user identification information together with the image is settable by a user having an administrative right and not settable by a user not having an administrative right.

20. The method according to claim 9, wherein the cancelling the printing based on the received print job includes deleting the received print job.

* * * * *